United States Patent
Wild et al.

(10) Patent No.: US 7,287,377 B2
(45) Date of Patent: Oct. 30, 2007

(54) METHOD AND DEVICE FOR OPERATING AN INTERNAL COMBUSTION ENGINE

(75) Inventors: Ernst Wild, Oberriexingen (DE); Sabine Wegener, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/054,150

(22) Filed: Feb. 8, 2005

(65) Prior Publication Data
US 2005/0217647 A1 Oct. 6, 2005

(30) Foreign Application Priority Data
Mar. 31, 2004 (DE) .................... 10 2004 015 742

(51) Int. Cl.
*F02D 23/00* (2006.01)
*F02B 33/00* (2006.01)
(52) U.S. Cl. ........................................ 60/602; 123/564
(58) Field of Classification Search .......... 60/600–603, 60/611; 123/564
See application file for complete search history.

(56) References Cited

U.S. PATENT DOCUMENTS

| 3,096,614 | A | * | 7/1963 | Silver et al. ................. 60/602 |
| 4,686,830 | A | * | 8/1987 | Buck et al. ................... 60/602 |
| 5,121,604 | A | * | 6/1992 | Berger et al. ................. 60/602 |
| 5,231,830 | A | * | 8/1993 | Entenmann et al. .......... 60/602 |
| 5,442,918 | A | * | 8/1995 | Baeuerle et al. .............. 60/602 |
| 5,454,360 | A | * | 10/1995 | Shimizu et al. ............. 123/564 |
| 5,551,235 | A | * | 9/1996 | Entenmann et al. .......... 60/602 |
| 6,058,708 | A | * | 5/2000 | Heinitz et al. ................ 60/602 |
| 6,295,816 | B1 | * | 10/2001 | Gallagher et al. .......... 123/564 |
| 6,401,457 | B1 | * | 6/2002 | Wang et al. ................... 60/602 |
| 6,584,772 | B2 | * | 7/2003 | Haupt et al. .................. 60/602 |
| 6,644,029 | B2 | * | 11/2003 | Weinreuter ................... 60/602 |
| 6,804,601 | B2 | * | 10/2004 | Wang et al. ................... 60/602 |
| 2003/0101723 | A1 | * | 6/2003 | Birkner et al. ................ 60/602 |
| 2003/0213244 | A1 | | 11/2003 | Faletti ......................... 60/602 |
| 2005/0172627 | A1 | * | 8/2005 | Baize et al. ................... 60/602 |

FOREIGN PATENT DOCUMENTS

| DE | 10065266 | 7/2002 | |
| DE | 10319347 | 11/2004 | |
| FR | 2540180 A1 * | 8/1984 | .................. 60/602 |
| FR | 2821889 | 2/2002 | |
| WO | WO2004/079174 | 9/2004 | |

\* cited by examiner

*Primary Examiner*—Thai-Ba Trieu
(74) *Attorney, Agent, or Firm*—Kenyon & Kenyon LLP

(57) ABSTRACT

A method and a device for operating an internal combustion engine make it possible from the start to avoid operating states that are characterized by an increased knock tendency or an increased exhaust gas temperature. The internal combustion engine includes a compressor in an air feed of the internal combustion engine for compression of the air supplied to the internal combustion engine. The setpoint charge pressure to be generated by the compressor is limited to a maximally allowed setpoint charge pressure as a function of a temperature at the output side of the compressor.

6 Claims, 2 Drawing Sheets

200
METHOD AND DEVICE FOR OPERATING AN INTERNAL COMBUSTION ENGINE

BACKGROUND INFORMATION

In internal combustion engines that have a compressor in an air feed to the internal combustion engine to compress the air supplied to the internal combustion engine, both the pressure and the temperature in the air feed are higher downstream from the compressor than upstream from the compressor. For this reason an intercooler is utilized downstream from the compressor, which reverses a portion of the temperature increase. Nevertheless, the temperature in the combustion chamber is still higher, and there is an increased knocking tendency. A knock control removes knocking by retarding the ignition. This lowers the efficiency and simultaneously increases the exhaust gas temperature. Counter measures are then provided, which reduce the knock tendency and lower the exhaust gas temperature to permissible values by enriching the air/fuel mixture and lowering the charge.

SUMMARY OF THE INVENTION

The method according to the present invention and the device for operating an internal combustion engine according to the present invention have the advantage that the setpoint charge pressure to be generated by the compressor is limited to a maximally permissible (allowed) setpoint charge pressure as a function of a temperature at the output side of the compressor. Operating states of the internal combustion engine that lead to an undesirably high temperature on the output side of the compressor are avoided from the outset in this manner. Thus, the knock tendency may be reduced from the start without having to accept a higher exhaust gas temperature. This also does not require any complicated counter measures such as enriching the air/fuel mixture or reducing the charge.

It is possible to ascertain the correlation between the maximally permissible setpoint charge pressure and the temperature at the output side of the compressor in a particularly simple and cost-effective manner by a control based on characteristic curves or characteristic maps.

Another advantage results if a maximally permissible temperature of the air at the air feed exit of the compressor is specified as temperature at the output side of the compressor and the maximally permissible setpoint charge pressure is ascertained as a function of the maximally allowed temperature. This makes it possible to utilize a physical correlation between the pressure ratio and the temperature ratio above the compressor for determining the maximally permissible setpoint charge pressure, such a physical correlation being representable mathematically in a relatively uncomplicated manner.

A simple procedure for ascertaining the maximally permissible setpoint charge pressure may be derived from this mathematical representation. In the process, a maximally permissible compressor pressure ratio is predefined as a function of the maximally allowed temperature of the air at the air feed exit of the compressor, and the maximally allowed setpoint charge pressure is ascertained from the maximally allowed compressor pressure ratio. The setpoint charge pressure to be generated by the compressor is then limited to the maximally allowed setpoint charge pressure.

The maximally allowed compressor pressure ratio for maintaining the maximally permissible temperature of the air at the air feed exit of the compressor may be ascertained in an especially simple manner as a function of the temperature of the air at the air feed entrance of the compressor, using a characteristic curve.

DETAILED DESCRIPTION

Figure 1:
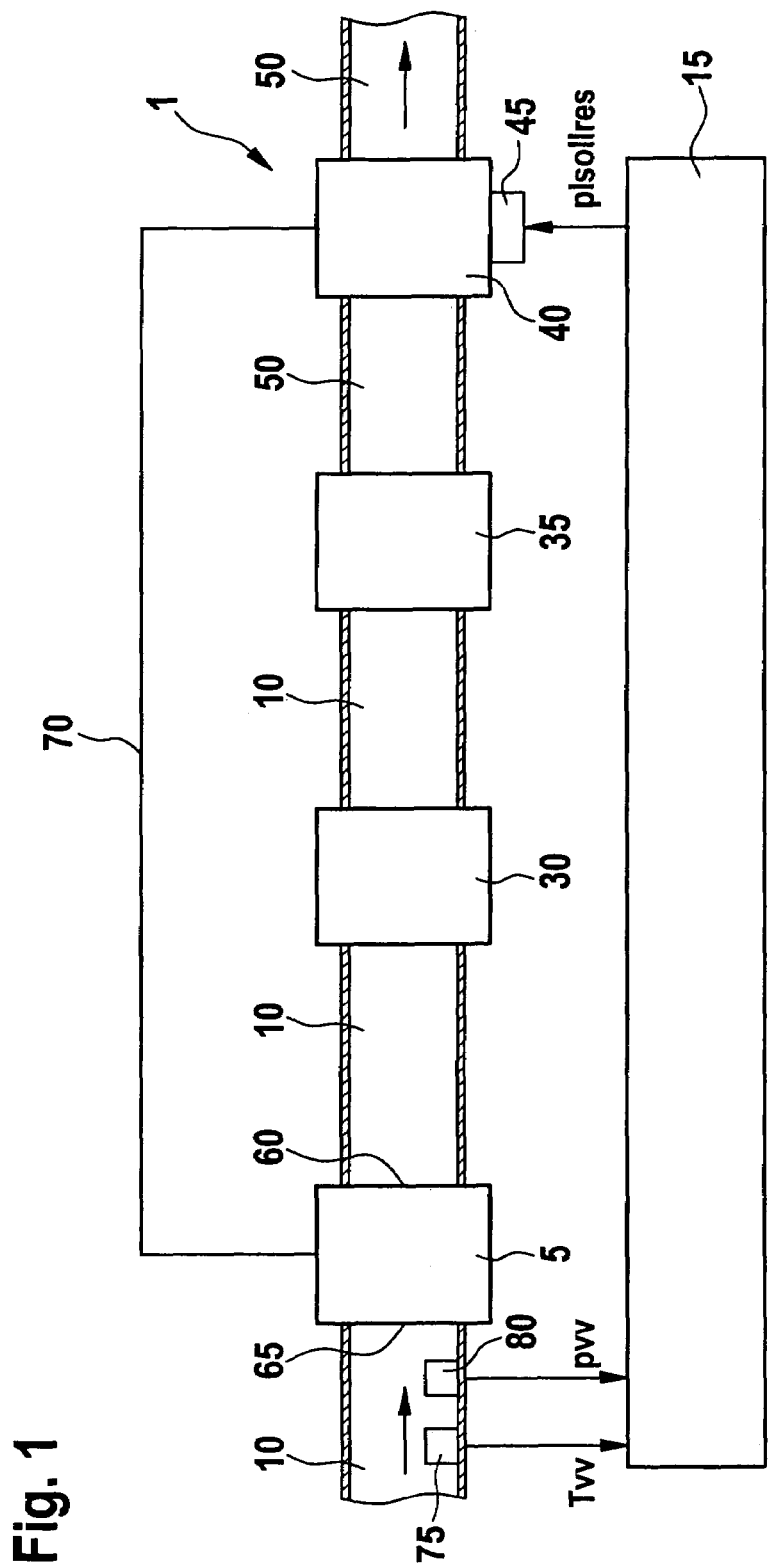
FIG. 1 shows a block diagram of an internal combustion engine.

In FIG. 1, reference numeral 1 designates an internal combustion engine, which drives a motor vehicle, for instance. Internal combustion engine 1 may take the form of, e.g. a spark-ignition engine or a diesel engine. It includes one or several cylinder(s), one of which is shown in FIG. 1 by way of example and provided with reference numeral 35. Cylinder 35 is able to be supplied with fresh air via an air feed 10. The flow direction of the fresh air in air feed 10 is indicated by an arrow in FIG. 1. A compressor 5, which compresses the air supplied to cylinder 35 via air supply 10, is disposed in air feed 10. As shown in FIG. 1, compressor 5 may be part of an exhaust-gas turbocharger and be driven via a shaft 70 by a turbine 40 in an exhaust tract 50 of internal combustion engine 1. However, as an alternative, compressor 5 could also be a compressor driven by a crankshaft of internal combustion engine 1 or an electrically operated charger. Upstream, compressor 5 has an air feed entry 65 and, downstream, it has an air feed exit 60. According to the example of FIG. 1, a temperature sensor 75 and a pressure sensor 80 are disposed in the flow direction of the fresh air in front of compressor 5 in air feed 10. Temperature sensor 75 measures temperature Tvv in front of compressor 5 and forwards the measured value to an engine control 15. Pressure sensor 80 measures pressure pvv in front of compressor 5 and forwards the measured value to engine control 15. As an alternative, temperature Tvv in front of compressor 5 and/or pressure pvv in front of compressor 5 may also be modeled by engine control 15 from other performance quantities of internal combustion engine 1 in a manner known to one skilled in the art. Compressor 5 compresses the air it receives via air feed entry 65, so that the pressure and the temperature of the air at air feed exit 60 are greater in each case than they are at air feed entry 65. The following correlation exists between the pressure ratio and the temperature ratio above compressor 5:

$$\frac{pnv}{pvv} = \left[\left(\frac{Tnv}{Tvv} - 1\right) * \eta\right]^{\frac{\gamma}{\gamma-1}} + 1 \tag{1}$$

In equation (1), pnv is the pressure of the air at air feed exit 60, Tnv the temperature of the air at air feed exit 60, η the compressor efficiency and γ the isentropic exponent.

Downstream from compressor 5 in the flow direction of the fresh air, an intercooler 30 is disposed in air feed 10, which at least partially cools the temperature of the air which increased during the compression by compressor 5. A cylinder 35 is arranged downstream from intercooler 30 in the flow direction of the fresh air. Additional components for operating internal combustion engine 1, such as the fuel injector and spark plug (the latter only in the case of spark ignition engines) are not shown in FIG. 1 for reasons of clarity. An actuator 45 is provided in the region of turbine 40 to adjust a predefined setpoint charge pressure at air feed exit 60. Actuator 45 may be, for instance, a bypass valve in a bypass bypassing turbine 40, which—depending on the opening degree—guides a corresponding portion of the exhaust mass flow past turbine 40. As an alternative, actuator 45 may influence a variable turbine geometry of turbine 40 and thereby influence the charge pressure at air feed exit 60. For the adjustment of a predefined setpoint charge pressure plsollres, actuator 45 is controlled by engine control 15. In the process, engine control 15 may specify the setpoint charge pressure as a function of, for instance, a driver wish, in a manner known to one skilled in the art. To this end engine control 15 may analyze the driver-pedal position of a driver pedal, which is not shown in FIG. 1. The charge pressure actually coming about at air feed exit 60 corresponds to pressure pnv of the air at air feed exit 60 in equation (1).

According to the present invention, the setpoint charge pressure to be generated by compressor 5 is limited to a maximally allowed setpoint charge pressure as a function of a temperature at the output side of compressor 5. The temperature at the output side of compressor 5 may be the exhaust gas temperature, for instance, or the temperature in the combustion chamber of cylinder 35. After all, not only is the exhaust gas temperature to be limited to permissible values with the aid of the method according to the present invention and the device according to the present invention, but the knock tendency may be reduced as well by limiting the temperature in the combustion chamber. The correlation between the maximally permissible setpoint charge pressure and the temperature at the output side of compressor 5 may be ascertained in a manner, for instance, that is controlled via characteristic curves or characteristics maps. To ascertain such a characteristics map, the individually assigned maximally allowed setpoint charge pressure may be determined on a test stand for various operating points of internal combustion engine 1 and various predefined maximally permitted exhaust gas-temperatures or maximally permissible combustion-chamber temperatures.

Thus, it is possible during operation of internal combustion engine 1 and by predefining a maximally permissible exhaust gas temperature or a maximally permitted combustion chamber temperature to ascertain the associated maximally allowed setpoint charge pressure from the corresponding characteristic map as a function of the instantaneous operating point of internal combustion engine 1. The setpoint charge pressure, which is predefined by engine control 15 as a function of the driver wish, for instance, will then be limited to this maximally allowed setpoint charge pressure.

An especially advantageous specific embodiment of the present invention utilizes the physical correlation between the pressure ratio and the temperature ratio above compressor 5 according to equation (1). To this end, a maximally allowed temperature of the air at the air feed exit of compressor 5 is predefined as temperature at the output side of compressor 5, and the maximally permissible setpoint charge pressure to which the setpoint charge pressure predefined by engine control 15 is limited, is ascertained as a function of this maximally allowed temperature. Starting from equation (1), the following correlation is obtained:

$$\frac{pnv\,\max}{pvv} = \left[\left(\frac{Tnv\,\max}{Tvv}\right)*\eta\right]^{\frac{\gamma}{\gamma-1}} + 1 \quad (2)$$

In equation (2) Tnvmax is the maximally permitted temperature of the air at the air feed exit of compressor 5, and pnvmax the associated maximally permitted setpoint charge pressure at the air feed exit of compressor 5. At specified maximally permitted temperature Tnvmax of the air at the air feed exit of compressor 5 and at compressor efficiency η known in engine control 15, and with isentropic exponent γ known in engine control 15, it is possible on the basis of equation (2) to generate a function that represents the maximally permissible pressure ratio pnvmax/pvv above compressor 5 for maintaining the predefined maximally permissible temperature Tnvmax of the air at the air feed exit of compressor 5 as a function of temperature Tvv of the air at the air feed entry of compressor 5. This function may also be ascertained on a test stand, for instance, within the framework of an application, and be stored in a characteristic curve 25 in engine control 15. The maximally allowed compressor pressure ratio pnvmax/pvv is multiplied by pressure pvv in front of compressor 5, in this way yielding the maximally permitted setpoint charge pressure pnvmax, which is entered in the charge pressure control where it limits the setpoint charge pressures specified there as to their maximum.

Figure 2:
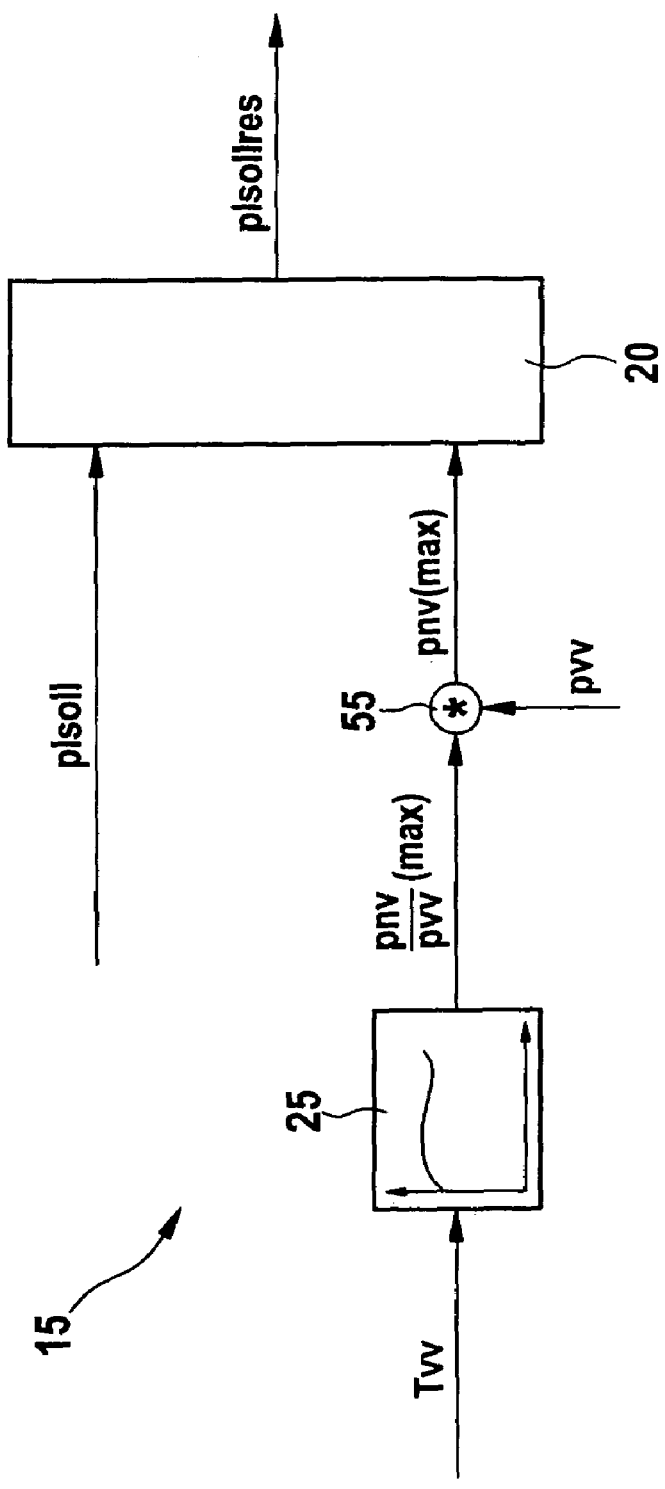
FIG. 2 shows a flow chart to elucidate the method according to the present invention and the device according to the present invention.

FIG. 2 shows a flow chart, which illustrates the sequence of the method according to the present invention and may be implemented in engine control 15 in the form of hardware and/or software. In the process, temperature Tvv of the air at air feed entry 65 of compressor 5 is supplied to characteristic curve 25 as input variable. Characteristic curve 25 assigns to temperature Tvv of the air at air feed entry 65 of compressor 5 a maximally permissible compressor pressure ratio pnvmax/pvv as output variable. Maximally permitted compressor pressure ratio pnvmax/pvv is then multiplied in a multiplication member 55 by pressure pvv in front of compressor 5, i.e., the pressure of the air at air feed entry 65 of compressor 5. The output variable of multiplication member 55 then the maximally permitted setpoint charge pressure pnvmax. This, together with setpoint charge pressure plsetpoint specified by engine control 15 as a function of the driver wish, for instance, is supplied to a minimum selection element 20, which transmits the lower of the two input values plsetpoint, pnvmax to actuator 45 as resulting setpoint charge pressure plsollres to be implemented. Minimum selection element 20 therefore constitutes corresponding limiting means or a corresponding limiting unit, which limits predefined setpoint charge pressure plsetpoint to the maximally allowed setpoint charge pressure pnvmax.

What is claimed is:

1. A method for operating an internal combustion engine having a compressor in an air feed of the internal combustion engine for compression of air supplied to the internal combustion engine, the method comprising:
   specifying a setpoint charge pressure to be generated;
   ascertaining a maximum allowable setpoint charge pressure as a function of a temperature at an output side of the compressor; and limiting the specified setpoint charge pressure to the maximum allowable setpoint charge pressure.

2. The method according to claim 1, further comprising ascertaining a correlation between the maximum allowed setpoint charge pressure and the temperature at the output side of the compressor in one of a characteristic-curve- and characteristics-map-controlled manner.

3. The method according to claim 1, further comprising:
specifying a maximally allowed temperature of air at an air feed exit of the compressor as temperature at the output side of the compressor; and
ascertaining the maximum allowed setpoint charge pressure as a function of the maximally allowed temperature.

4. A method for operating an internal combustion engine having a compressor in an air feed of the internal combustion engine for compression of air supplied to the internal combustion engine, the method comprising:
limiting a setpoint charge pressure to be generated by the compressor to a maximum allowed setpoint charge pressure as a function of a temperature at an output side of the compressor;
specifying a maximally allowed temperature of air at an air feed exit of the compressor as temperature at the output side of the compressor;
ascertaining the maximum allowed setpoint charge pressure as a function of the maximally allowed temperature;
predefining a maximum allowed compressor pressure ratio as a function of the maximally allowed temperature of the air at the air feed exit of the compressor, and wherein the maximum allowed setpoint charge pressure is ascertained from the maximum allowed compressor pressure ratio, and the setpoint charge pressure to be generated by the compressor is limited to the maximum allowed setpoint charge pressure.

5. The method according to claim 4, wherein the maximum allowed compressor pressure ratio for maintaining the maximally allowed temperature of the air at the air feed exit of the compressor is ascertained as a function of a temperature of air at an air feed entry of the compressor, using a characteristic curve.

6. A device for operating an internal combustion engine having a compressor in an air-supply duct of the internal combustion engine for compressing the air supplied to the internal combustion engine, comprising:
means for specifying a setpoint boost pressure to be generated;
means for ascertaining, in addition to the specified setpoint boost pressure, a maximum allowable setpoint boost pressure as a function of a temperature on an output side of the compressor; and
means for limiting the specified setpoint boost pressure to the maximum allowable setpoint boost pressure.

* * * * *